Nov. 26, 1929.   L. E. MILLER   1,737,510
REAMER
Filed April 10, 1925
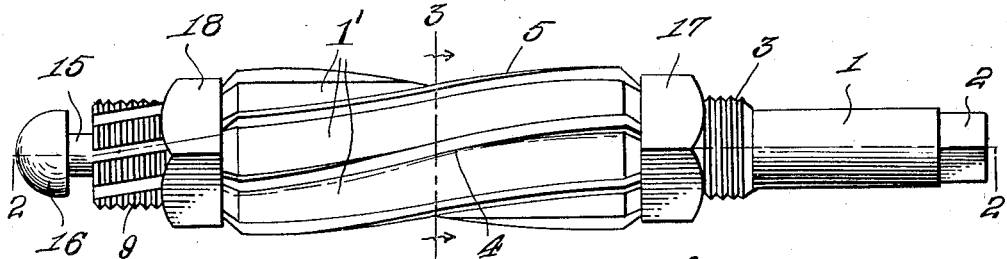
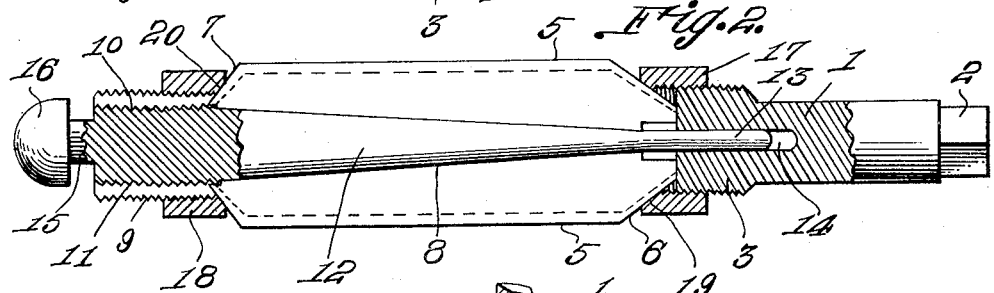
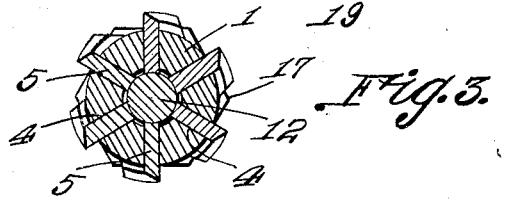
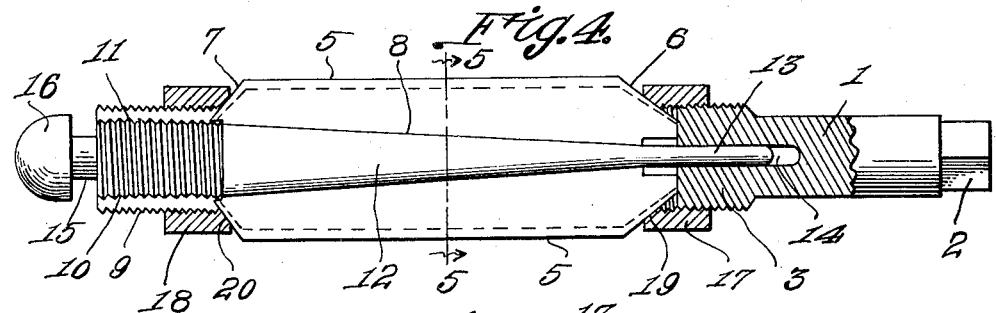
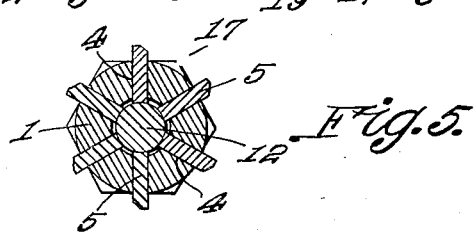
Lawrence E. Miller
INVENTOR
BY Victor J. Evans
ATTORNEY Patented Nov. 26, 1929

1,737,510

UNITED STATES PATENT OFFICE

LAWRENCE E. MILLER, OF COWEN, WEST VIRGINIA

REAMER

Application filed April 10, 1925. Serial No. 22,167.

My present invention has reference to an adjustable reamer and has for its object the provision of means whereby the blades of the reamer can be easily and quickly expanded or contracted and firmly held in either of such positions.

A further object is the provision of a tool for this purpose, characterized by simplicity of construction, cheapness in manufacture and thorough efficiency in operation.

With the above recited objects in view, the invention further consists in the novel features of construction, combination and operative association of parts, such as is disclosed by the following description when read on the attached drawings.

In the drawings:—

Figure 1 is a side elevation of an adjustable reamer in accordance with this invention.

Figure 2 is a sectional view on the line 2—2 of Figure 1.

Figure 3 is a sectional view on the line 3—3 of Figure 1.

Figure 4 is a view substantially similar to Figure 2, but in which straight blades are employed.

Figure 5 is a sectional view on line 5—5 of Figure 4.

The body 1 of my improvement has a squared chuck engaging end 2. The body, at a suitable distance from its said end 2, is thickened, and this thickened portion, for a determined distance, is threaded, as at 3. At the terminal of the threads 3 the body is formed with curved longitudinally extending openings 4 that communicate with its bore 10. The openings 10 thus provide the body 1 with a plurality of equidistantly spaced fingers 1'. The fingers may be spread away from each other to permit of the insertion of curved cutter blades 5 through the openings 4 between the fingers. Both ends of the blades 5 are beveled, as at 6, and 7, respectively, and the inner edges of the said blades are tapered as indicated by the numeral 8. The outer ends of the fingers 1' are reduced and threaded, as at 9. The fingers have their inner faces, at the outer portion of the bore 10, threaded, as at 11, and screwed on these threads there is the threaded portion of an expanding cone 12. The cone, of course, contacts with the tapered edges of the blades and the reduced end of the cone is round and straight, as at 13, and is received in a pocket 14 in the portion 3 of the body 1. The expanding cone 12, outward of its threaded portion 11, is formed with a neck extension 15 that terminates in a semi-spherical head 16.

Screwed on the threaded portion 3 of the body 1 and on the outer threads 9 of the fingers 1' there are nuts 17 and 18, respectively. Each of these nuts has its inner or confronting end flared inwardly to its bore, as indicated by the numerals 19 and 20. The walls 19 and 20 contact with the angle ends 6 and 7 of the blades 5 to effectively hold the blades pocketed between the fingers 1'. By loosening the nuts 17 and 18 and screwing the expanding cone 12 in the body the blades 5 will be expanded, and when the nuts 17 and 18 are screwed home the same will be effectively held in such position. By unscrewing the expanding cone and loosening the nuts 17 and 18 the cutting edges of the blades may be arranged closer to the body 1, the nuts 17 and 18 being thereafter screwed home to hold the said blades in such position and it is thought from the foregoing description, when taken in connection with the drawings, will fully set forth the simplicity of my construction and the advantages thereof to those skilled in the art to which such inventions relate.

Having described the invention, I claim:—

An expansible reamer, comprising a body having an enlarged threaded portion and being formed with a longitudinal bore entering from one of its ends and terminating at the said threaded portion, said body from the threaded portion being provided with spaced longitudinally curved openings that communicate with its bore and provide the body with spaced curved fingers, said body, in a line with the center of the bore, having a pocket in its enlarged threaded portion, the fingers having their outer ends reduced and threaded both interiorly and exteriorly, longitudinally curved blades having beveled ends received in the openings between the fingers, an expansion cone tapered for a portion of its length and having an unthreaded nontapered reduced end received in the pocket of the body, said cone having a threaded portion which engages with the inner threads of the fingers, a neck extension formed on the threaded portion of the cone, a semi-spherical head for the neck extension and nuts screwed respectively on the threaded portion of the body and on the exterior threads of the fingers and contacting the opposite beveled ends of the blades, as and for the purpose set forth.

In testimony whereof I affix my signature.

LAWRENCE E. MILLER.